(12) United States Patent
Chari et al.

(10) Patent No.: US 7,108,891 B2
(45) Date of Patent: Sep. 19, 2006

(54) RANDOM ARRAY OF MICROSPHERES

(75) Inventors: Krishnan Chari, Fairport, NY (US);
Tiecheng A. Qiao, Webster, NY (US);
Ramasubramaniam Hanumanthu,
Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 489 days.

(21) Appl. No.: 10/092,803

(22) Filed: Mar. 7, 2002

(65) Prior Publication Data

US 2003/0170392 A1 Sep. 11, 2003

(51) Int. Cl.
*B05D 1/36* (2006.01)
*B05D 5/00* (2006.01)

(52) U.S. Cl. .................. 427/261; 427/2.13; 427/202; 427/337; 427/338; 427/372.2; 427/407.1; 427/407.2; 427/412.1; 427/412.2

(58) Field of Classification Search ............ 427/261, 427/2.1, 2.11, 2.13, 180, 202, 299, 337, 338, 427/355, 372.2, 402, 407.1–407.2, 414–415
See application file for complete search history.

(56) References Cited

U.S. PATENT DOCUMENTS

| 5,412,087 A | 5/1995 | McGall et al. |
| 5,489,678 A | 2/1996 | Fodor et al. |
| 5,981,180 A | 11/1999 | Chandler et al. |
| 6,023,540 A | 2/2000 | Walt et al. |
| 6,079,283 A | 6/2000 | Papen et al. |
| 6,083,762 A | 7/2000 | Papen et al. |
| 6,094,966 A | 8/2000 | Papen et al. |
| 6,340,588 B1 * | 1/2002 | Nova et al. ............... 435/287.1 |
| 2003/0073086 A1 * | 4/2003 | Guire et al. .................. 435/6 |

OTHER PUBLICATIONS

*Science*, Research Article, Feb. 1991, pp 767–773, "Light–Directed Spatially Addressable Parallel Chemical Synthesis," by Stephen P. A. Fodor et al.
*Nature Biotech*, "Quantum–dot–tagged microbeads for multiplexed optical coding of biomolecules," 19, 631–635, (2001).

* cited by examiner

*Primary Examiner*—Timothy Meeks
*Assistant Examiner*—William Phillip Fletcher, III
(74) *Attorney, Agent, or Firm*—Kathleen Neuner Manne

(57) ABSTRACT

A method of making a microarray comprising the steps of:
  providing a support;
  coating on the support a receiving layer to receive microspheres, the receiving layer being capable of undergoing sol/gel transition;
  coating on the receiving layer a dispersion of microspheres in a carrier fluid, wherein the carrier fluid contains at least one crosslinking agent and is capable of solvating the receiving layer;
  allowing the microspheres to partially submerge into the receiving layer;
  creating conditions to induce sol/gel transition in the receiving layer, thus immobilizing the microspheres;
  evaporating off the carrier fluid; and
  allowing crosslinking reaction between the receiving layer and the crosslinker in the carrier fluid.

30 Claims, 5 Drawing Sheets

(4 of 5 Drawing Sheet(s) Filed in Color)

Process for Preparing Random Bead Micro-array

Beads partially submerge into fluid layer containing gelling agent due to gravity Gelling agent undergoes sol-gel transition to increase viscosity (preferred) and restrict lateral movement of beads Water is evaporated from the top layer to expose the surface of the beads Gelling agent undergoes cross-linking reaction to permanently fix the beads

RANDOM ARRAY OF MICROSPHERES

FIELD OF THE INVENTION

The present invention concerns biological microarray technology in general. In particular, it concerns a microarray coated on a substrate that contained no sites designated prior to coating to attract the microspheres.

BACKGROUND OF THE INVENTION

Ever since it was invented in the early 1990s (Science, 251, 767–773, 1991), high-density arrays formed by spatially addressable synthesis of bioactive probes on a 2-dimensional solid support has greatly enhanced and simplified the process of biological research and development. The key to current microarray technology is deposition of a bioactive agent at a single spot on a microchip in a "spatially addressable" manner.

Current technologies have used various approaches to fabricate microarrays. For example, U.S. Pat. Nos. 5,412,087, and 5,489,678 demonstrate the use of a photolithographic process for making peptide and DNA microarrays. The patent teaches the use of photolabile protecting groups to prepare peptide and DNA microarrays through successive cycles of deprotecting a defined spot on a 1 cm×1 cm chip by photolithography, then flooding the entire surface with an activated amino acid or DNA base. Repetition of this process allows construction of a peptide or DNA microarray with thousands of arbitrarily different peptides or oligonucleotide sequences at different spots on the array. This method is expensive. An ink jet approach is being used by others (e.g., U.S. Pat. Nos. 6,079,283; 6,083,762; and 6,094,966) to fabricate spatially addressable arrays, but this technique also suffers from high manufacturing cost in addition to the relatively large spot size of 40 to 100 µm. Because the number of bioactive probes to be placed on a single chip usually runs anywhere from 1000 to 100000 probes, the spatial addressing method is intrinsically expensive regardless how the chip is manufactured. An alternative approach to the spatially addressable method is the concept of using fluorescent dye-incorporated polymeric beads to produce biological multiplexed arrays. U.S. Pat. No. 5,981,180 discloses a method of using color coded beads in conjunction with flow cytometry to perform multiplexed biological assay. Microspheres conjugated with DNA or monoclonal antibody probes on their surfaces were dyed internally with various ratios of two distinct fluorescence dyes. Hundreds of "spectrally addressed" microspheres were allowed to react with a biological sample and the "liquid array" was analyzed by passing a single microsphere through a flow cytometry cell to decode sample information. U.S. Pat. No. 6,023,540 discloses the use of fiber-optic bundles with pre-etched microwells at distal ends to assemble dye loaded microspheres. The surface of each spectrally addressed microsphere was attached with a unique bioactive agent and thousands of microspheres carrying different bioactive probes combined to form "beads array" on pre-etched microwells of fiber optical bundles. More recently, a novel optically encoded microsphere approach was accomplished by using different sized zinc sulfide-capped cadmium selenide nanocrystals incorporated into microspheres (Nature Biotech. 19, 631–635, (2001)). Given the narrow band width demonstrated by these nanocrystals, this approach significantly expands the spectral barcoding capacity in microspheres.

Even though the "spectrally addressed microsphere" approach does provide an advantage in terms of its simplicity over the old fashioned "spatially addressable" approach in microarray making, there are still needs in the art to make the manufacture of biological microarrays less difficult and less expensive.

U.S. Ser. No. 09/942,241 teaches various coating methods but exemplifies machine coating, whereby a support is coated with a fluid coating composition comprising microspheres dispersed in gelatin. Immediately after coating, the support is passed through a chill set chamber in the coating machine where the gelatin undergoes rapid gelation and the microspheres are immobilized.

While that invention provides a huge manufacturing advantage over then existing technologies, it needs some refinement in order to maximize its full potential value to the art. The problem is that during such machine coating and rapid gelation, the gelling agent tends to cover the surface of the microspheres, thereby preventing the analyte (such as DNA) from penetrating through the gel overcoat and hybridizing with probes on the surface of the microspheres.

U.S. Ser. No. 10/062,326, filed Jan. 31, 2002, overcomes the problem outlined above by enzymatically removing the gelling agent from the surface of the microspheres without damaging their integrity or the DNA probes on their surfaces. The enzyme treated surface maintains its physical integrity through the entire DNA hybridization process and the microarray shows a very strong hybridization signal.

The advantage of D83451 is that enzyme digestion can be easily controlled to remove the required amount from the gel overcoat. Further, the enzyme, a protease, is readily available and economical to obtain. However, there is a disadvantage in that an additional process (enzyme digestion) is required and this involves additional time and cost.

Hence, the technology still needs a process that overcomes the problem in a more economical manner.

SUMMARY OF THE INVENTION

The present invention provides a method of making a microarray wherein the microspheres are randomly dispersed on a receiving layer and have surfaces exposed above the receiving layer that are free to interact with the analyte. The present invention discloses:

A method of making a microarray comprising the steps of:

providing a support;

coating on the support a receiving layer to receive microspheres, the receiving layer being capable of undergoing sol/gel transition;

coating on the receiving layer a dispersion of microspheres in a carrier fluid, wherein the carrier fluid contains at least one crosslinking agent and is capable of solvating the receiving layer;

allowing the microspheres to partially submerge into the receiving layer;

creating conditions to induce sol/gel transition in the receiving layer, thus immobilizing the microspheres;

evaporating off the carrier fluid; and allowing crosslinking reaction between the receiving layer and the crosslinker in the carrier fluid.

The receiving layer and the support are characterized by an absence of sites designed to specifically interact physically or chemically with the microspheres. Hence, the distribution of the microspheres is not predetermined or directed, but is entirely random.

The invention utilizes a unique coating technology to prepare a microarray on a substrate that need not be pre-etched with microwells or premarked in any way with sites to attract the microspheres, as disclosed in the art. By using unmarked substrates or substrates that need no pre-coating preparation, the present invention provides a huge manufacturing advantage compared to the existing technologies. The invention discloses a method whereby color addressable mixed beads in a dispersion are randomly distributed on a receiving layer that has no wells or sites to attract the microspheres.

The present invention provides a microarray that is less costly and easier to prepare than those previously disclosed because the substrate does not have to be modified; nevertheless the microspheres remain immobilized on the substrate.

Further, the present invention provides a microarray wherein, in contrast to D82300, the bead surfaces are exposed but without employing the additional process step (enzyme digestion) disclosed in D83451. Exposed bead surfaces facilitate easier access of the analyte to probes attached to the surfaces of the beads. By "analyte" is meant molecules with functionalities capable of interacting chemically or physically with specific moieties on the bead surface, herein called "probes". In the present invention, the analyte is primarily nucleic acids or proteins.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is a diagram of the process of preparing a random bead microarray wherein FIG. 1a shows any suitable support; FIG. 1b shows the support coated with non-crosslinked gelling agent or precursor to a gelling agent; FIG. 1c shows an aqueous suspension of microspheres bearing probes, disposed on the support of FIG. 1b.

DETAILED DESCRIPTION OF THE INVENTION

Figure 1:
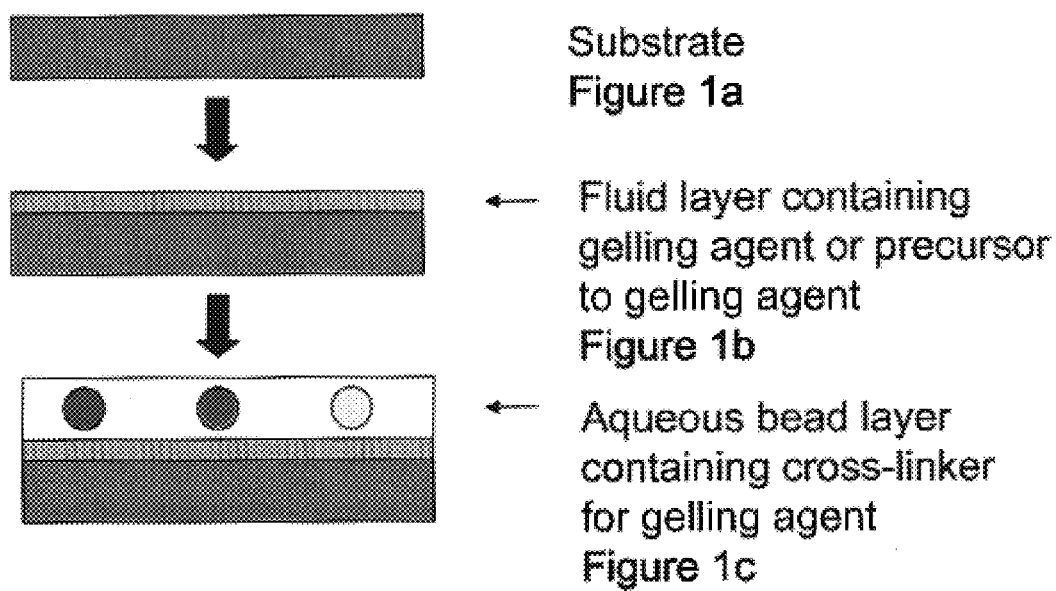
Figure 1D:
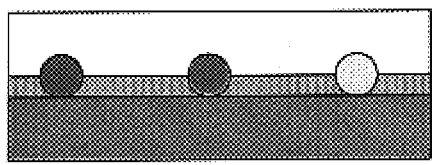
FIG. 1d shows the micropsheres of FIG. 1c sinking into the layer with the gelling agent (1b)
Figure 1E:
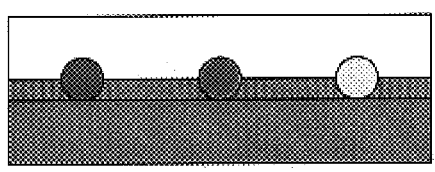
FIG. 1e shows the layer with the gelling agent undergoing sol/gel transition and thereby immobilizing the beads.
Figure 1F:
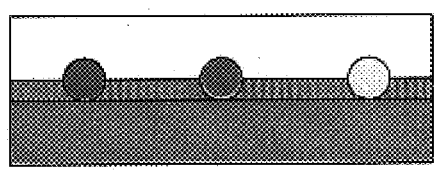
FIG. 1f shows the evaporation of fluid from the coating composition.
Figure 1G:
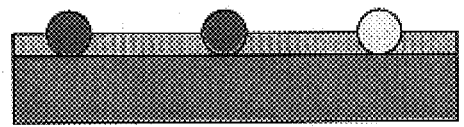
FIG. 1g shows the exposed surfaces of the beads after evaporation of the fluid wherein the beads are now immobilized in a crosslinked matrix.

As used herein, the term "sol-to-gel transition" or "gelation" means a process by which fluid solutions or suspensions of particles form continuous three-dimensional networks that exhibit no steady state flow. This can occur in polymers by polymerization in the presence of polyfunctional monomers, by covalent cross-linking of a dissolved polymer that possesses reactive side chains and by secondary bonding, for example, hydrogen bonding, between polymer molecules in solution. Polymers such as gelatin exhibit thermal gelation that is of the latter type. The process of gelation or setting is characterized by a discontinuous rise in viscosity. (See, P. I. Rose, "The Theory of the Photographic Process", $4^{th}$ Edition, T. H. James ed. pages 51 to 67).

As used herein, the term "gelling agent" means a substance that can undergo gelation as described above. Examples include materials such as gelatin, water-soluble cellulose ethers or poly(n-isopropylacrylamide) that undergo thermal gelation or substances such as poly(vinyl alcohol) that may be chemically cross-linked by a borate compound. Other gelling agents may be polymers that may be cross-linked by radiation such as ultraviolet radiation. Examples of gelling agents include acacia, alginic acid, bentonite, carbomer, carboxymethylcellulose sodium, cetostearyl alcohol, colloidal silicon dioxide, ethylcellulose, gelatin, guar gum, hydroxyethylcellulose, hydroxypropyl cellulose, hydroxypropyl methylcellulose, magnesium aluminum silicate, maltodextrin, methylcellulose, polyvinyl alcohol, povidone, propylene glycol alginate, sodium alginate, sodium starch glycolate, starch, tragacanth and xanthum gum. (For further discussion on gelling agents, see, accompanying reference Secundum Artem, Vol. 4, No. 5, Lloyd V. Allen). A preferred gelling agent is alkali pretreated gelatin.

As used herein, the term "random distribution" means a spatial distribution of elements showing no preference or bias. Randomness can be measured in terms of compliance with that which is expected by a Poisson distribution.

The present invention teaches a method for making a random array of microspheres, also referred to as "beads", on a substrate, also called a receiving layer. The microspheres are deposited on the receiving layer in such a way that the surfaces of microspheres are exposed above the receiving layer. The distribution or pattern of the microspheres on the substrate is entirely random and the microspheres are not attracted or held to sites that are pre-marked or predetermined on the substrate as in other methods previously disclosed. In the present invention, the microspheres are immobilized randomly when the gelling agent in which they partially submerge undergoes a sol-to-gel transition.

The random array is achieved by first coating on any suitable surface or support a fluid layer containing a gelling agent that has not undergone cross-linking. The support with the gelling agent is referred to as the receiving layer. An aqueous suspension of microspheres containing a cross-linker for the gelling agent is then spread over the receiving layer. The temperature of the aqueous suspension at the time of coating is preferably maintained above the sol-gel transition temperature of the gelling agent in the receiving layer. The fluid in the aqueous suspension solvates the gelling agent in the receiving layer and facilitates settling of the microspheres into the receiving layer. By "solvate" is meant the binding of one or more molecules of the suspension fluid to molecules of the gelling agent in the receiving layer. The microspheres are of a size and density such that they readily settle into the solvated receiving layer. It is believed that the propensity of the microspheres to settle may be defined on the basis of its Peclet number. The number is a ratio of settling forces on the microsphere to forces due to Brownian motion. An increase in density of the micro-sphere relative to that of the fluid or an increase in size of the micro-sphere would result in an increase in settling forces. It is preferred that the Peclet number is greater than 1. It is further preferred that the Peclet number is greater than 10.

The temperature of the entire composition comprising micro-spheres on the substrate with water and gelling agent is then modified to induce a sol-gel transition of the gelling agent. The sol-gel transition is accompanied by a large increase in viscosity of the receiving layer (preferably two orders of magnitude; more preferably three or more orders of magnitude) that helps prevent lateral aggregation of the micro-spheres when the water is evaporated. The latter is accomplished as the final stage in the preparation of the array. Evaporation of water from the array may be achieved by blowing air of a certain temperature and humidity over the array. After the array has been fully fabricated on the coating device, the cross-linking reaction of the gelling agent initiated earlier by addition of the cross-linker may go to completion to permanently fix the micro-spheres in place. If gelatin is used as the gelling agent, preferred cross-linkers may be compounds such as bis(vinylsulfone)methane, glutaraldehyde or succinaldehyde.

The invention discloses a polymeric latex bead based random microarray with each bead in the array having a distinct signature that would distinguish the bead. Such a signature may be based on color, shape or size of the bead. For signatures based on color, the color may be derived from mixing three dyes representing the primary colors R, G, B to create thousands of distinguishable beads with distinct "color addresses" (unique RGB values, e.g. R=0, G=204, B=153). The beads can be made with sites on their surface that are "active", meaning that at such sites physical or chemical interaction can occur between the bead and other molecules or compounds. Such compounds may be organic or inorganic. Usually, the molecule or compound is organic—nucleic acid, protein or fragments thereof, are examples. To the surface of each color coded bead may be attached a pre-synthesized oligonucleotide, a monoclonal antibody, or any other biological agents. Therefore, each color address can correspond to a specific bioactive probe. These beads may be mixed in equal amounts, and the random microarray fabricated by coating the mixed beads in a single or multilayer format.

Coating methods are broadly described by Edward Cohen and Edgar B. Gutoff in Chapter 1 of "Modem Coating And Drying Technology", (Interfacial Engineering Series; v. 1), (1992), VCH Publishers Inc., New York, N.Y. Suitable coating methods may include knife coating and blade coating.

Fluorescently/chemiluminescently labeled biological sample can be hybridized to the bead based random microarray. The signals from both "color addressable" polymeric beads and biological sample non-selectively labeled with fluorescence/chemiluminescence may be analyzed by a charge coupled device after image enlargement through an optical system. The recorded array image can be automatically analyzed by an image processing algorithm to obtain bioactive probe information based on the RGB color code of each bead, and the information compared to the fluorescence/chemiluminescence image to detect and quantify specific biological analyte materials in the sample. Optical or other electro-magnetic means may be applied to ascertain signature.

Although microspheres or particles having a substantially curvilinear shape are preferred because of ease of preparation, particles of other shape such as ellipsoidal or cubic particles may also be employed. Suitable methods for preparing the particles are emulsion polymerization as described in "Emulsion Polymerization" by I. Piirma, Academic Press, New York (1982) or by limited coalescence as described by T. H. Whitesides and D. S. Ross in J. Colloid Interface Science, vol. 169, pages 48–59, (1985). The particular polymer employed to make the particles or microspheres is a water immiscible synthetic polymer that may be colored. The preferred polymer is any amorphous water immiscible polymer. Examples of polymer types that are useful are polystyrene, poly(methyl methacrylate) or poly (butyl acrylate). Copolymers such as a copolymer of styrene and butyl acrylate may also be used. Polystyrene polymers are conveniently used. The formed microsphere is colored using an insoluble colorant that is a pigment or dye that is not dissolved during coating or subsequent treatment. Suitable dyes may be oil-soluble in nature. It is preferred that the dyes are non-fluorescent when incorporated in the microspheres.

The microspheres are desirably formed to have a mean diameter in the range of 1 to 50 microns; more preferably in the range of 3 to 30 microns and most preferably in the range of 5 to 20 microns. It is preferred that the concentration of microspheres in the coating is in the range of 100 to a million per $cm^2$, more preferably 1000 to 200,000 per $cm^2$ and most preferably 10,000 to 100,000 per $cm^2$.

The attachment of bioactive agents to the surface of chemically functionalized microspheres can be performed according to the published procedures in the art (Bangs Laboratories, Inc, Technote #205). Some commonly used chemical functional groups include, but not limited to, carboxyl, amino, hydroxyl, hydrazide, amide, chloromethyl, epoxy, aldehyde, etc. Examples of bioactive agents include, but are not limited to, oligonucleotides, DNA and DNA fragments, PNAs, peptides, antibodies, enzymes, proteins, and synthetic molecules having biological activities.

EXAMPLES

Example 1 (Control)

This and the following example illustrate the method of coating or fabricating a well-dispersed random array of microspheres wherein the surfaces of the micro-spheres are exposed above the surface of the receiving layer in which they are partially submerged.

Ten grams of a 4% aqueous suspension of carboxylated polystyrene beads prepared by emulsion polymerization and having a mean size of 10 microns was combined with 0.1 grams of poly(vinyl alcohol) (Gohsenol NK-05 from Nippon Gohsei; 71–75% hydrolyzed).

A suspension of magenta colored beads was prepared by first dissolving 0.01 grams of Dye 1 (MM2500EVV) in 0.05 grams of toluene and 4.95 grams of acetone. The above suspension of polystyrene beads was then added slowly (drop-wise) to this solution of the dye while stirring to prepare a suspension of colored beads. The suspension of colored beads was then filtered using a porous cotton filter, poured into a dialysis bag (12,000 to 14,000 molecular weight cut-off) and washed with distilled water for one hour. After washing, the suspension of colored beads was filtered again using a porous cotton filter. The concentration of magenta colored beads in the suspension after this final step was 1.0%.

Suspensions of cyan and yellow colored beads were prepared in a similar manner using Dye 2 (114FN-D89) and Dye 3 (Neopen Yellow 075 from BASF Corporation) respectively in place of Dye 1. The concentration of colored beads in these suspensions was 1.0%.

Formulations for coating were prepared as follows.

Receiving Layer Coating: This was prepared by combining 87 grams of a 11.5% solution of acid processed ossein gelatin (gelling agent) in water with 20 grams of coating aid (10.8% solution of Olin 10G in water) and 393 grams of distilled water.

Dispersion of Microspheres: This was prepared by combining 1.1 grams of the suspension of magenta colored beads, 1.1 grams of the suspension of cyan colored beads and 1.1 grams of the suspension of yellow colored beads with 6.96 grams of a 11.5% solution of lime processed ossein gelatin in water. 1.6 grams of coating aid (6.8% solution of Triton X 200E in water), 5 grams of cross-linker for gelatin (1.8% solution of bis(vinylsulfonyl)methane in water) and 23.1 grams of distilled water.

The receiving layer was first coated on a flexible polyester substrate containing a 0.1 mm thick pad of unhardened (non-cross-linked) gelatin using the device shown in FIG. 1. The formulations were introduced through a slot coating die 2 driven by a motor M4 at a temperature of 45° C. on to a 12.7 cm wide web 6 moving at a rate of 3.7 m/min. The flow rate was adjusted to provide a level of 1.08 g/m² of gelatin. The coating was chill-set in a 2.4 m long chilling section 8 that was maintained at a temperature of 4° C. and 56.6% RH and then passed through a conditioning chamber 10 before being dried in a first 12 and then a second 14 drying section that were 9.8 m and 11.6 m in length respectively. The first drying section was maintained at a temperature of 21° C. and 33.2% RH and the second was maintained at a temperature of 37.8° C. and 18.6% RH.

The dispersion of microspheres was then coated over the receiving layer using the same device and conditions. The flow rate of the main layer composition through the coating die was adjusted to provide a total bead coverage of 0.043 g/m².

Analysis of the surface of the coatings by optical microscopy showed that a well-dispersed random array of colored beads or micro-spheres was obtained. However, analysis of cross-sections showed that while a mono-layer of the microspheres was successfully achieved, there existed a thin covering of gelatin over the upper surfaces of the microspheres that was undesirable.

Dye 1 (MM2500EVV)

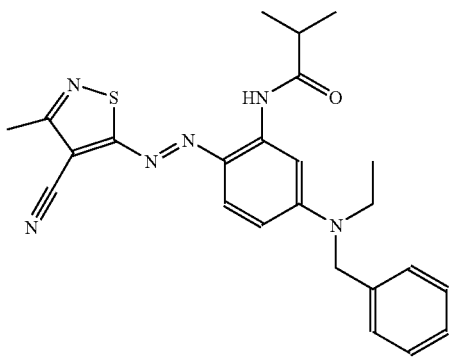

Dye 2 (114FN-D89)

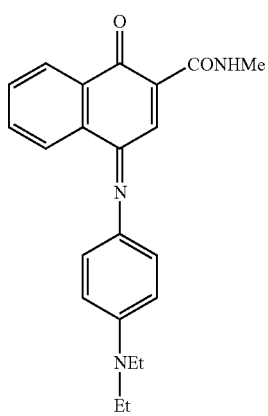

Dye 4 (MM2500FAN)

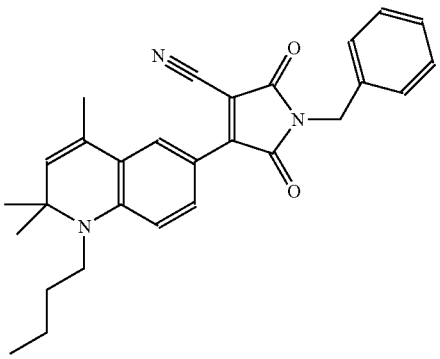

Example 2 (Invention)

This Example is the same as example 1, but characterized by the absence of gelling agent in the dispersion of microspheres.

Suspensions of magenta, cyan and yellow colored beads (containing Dye 1, Dye 2 and Dye 3 respectively) were prepared in a manner similar to that described under Example 1. In addition a suspension of purple colored beads containing Dye 4 was also prepared. The concentration of colored beads in these suspensions was close to 1% in all cases.

Formulations for coating were prepared as follows.

Receiving Layer: This was prepared in the same manner as described under Example 1.

Dispersion of Microspheres: An aqueous composition with colored beads and no gelling agent was prepared by combining 1.5 grams of the suspension of magenta colored beads, 1.5 grams of the suspension of cyan colored beads and 1.5 grams of the suspension of yellow colored beads, 8 grams of the suspension of purple colored beads and 1.8 grams of clear non-colored beads (4% beads concentration) with 0.96 grams of coating aid (6.8% solution of Triton X 200E in water), 4 grams of cross-linker for gelatin (1.8% solution of bis(vinylsulfonyl) methane in water) and 4.74 grams of distilled water.

The sub-layer was coated in exactly the same manner as outlined in Example 1. The aqueous dispersion of microspheres was then coated over the receiving layer to give a total bead coverage of 0.129 g/m².

Analysis of the surfaces of these coatings by optical microscopy after they had fully dried showed that once again a well-dispersed random array of colored beads or micro-spheres was obtained. Furthermore, examination of the cross-sections showed a mono-layer of beads that were partially submerged into the gelatin sub-layer leaving the upper surfaces fully exposed.

Example 3

This example illustrates the effect of cross-linking the gelatin (gelling agent) in the sub-layer prior to coating the main layer.

Magenta, Cyan and Purple colored beads were prepared in a manner analogous to that described in Examples 1 and 2. The final concentrations of beads in these suspensions were 0.84%, 0.93% and 1.21% respectively.

Formulations for coating were prepared in the following manner.

Receiving Layer 1 (control): This was prepared by combining 87 grams of acid processed ossein gelatin (gelling agent), 50 grams of cross-linking agent for the gelatin (1.8% solution of bis(vinylsulfonyl)methane in water), 20 grams of coating aid (10.8% solution of Olin 10G in water) and 343 grams of distilled water.

Receiving Layer 2 (invention): The composition was the same as that for receiving layer 1 except that it did not contain a cross-linking agent.

Dispersion of Microspheres: This was prepared by combining 10.9 grams of the suspension of magenta colored beads, 10.3 grams of the suspension of cyan colored beads and 8.3 grams of the suspension of purple colored beads with 4.8 grams of coating aid (6.8% solution of Triton X 200E in water) and 85.7 grams of distilled water.

Both receiving layer compositions were coated on a polyester support having a 0.1 mm unhardened (non-cross-linked) gelatin pad using the same device and procedure outlined in Example 1. The dispersion of microspheres was then coated over each of the two sub layers. In the case of sub-layer 1 (control) it was found that a uniform distribution of beads was not obtained when the surface of the coating was examined by optical microscopy. The majority of beads were clustered in regions of the surface. This is not desirable. However, in the case of sub-layer 2 (invention), examination of the coating showed a well-dispersed random array.

Example 4

This example illustrates the attachment of pre-synthesized single strand oligonucleotide probe to the surface of dye incorporated beads, and the detection of hybridization with fluorescently labeled complementary single strand DNA on the surface of such modified beads.

One hundred microliters of Dye 2 (114FN-D89) incorporated beads (4% w/v) was rinsed three times in acetate buffer (0.01 M, pH5.0), and combined with one hundred microliters of 20 mM 2-(4-Dimethylcarbomoyl-pyridino)-ethane-1-sulfonate and ten percent of polyethyleneimine. The mixture was agitated at room temperature for one hour and rinsed three times with sodium boric buffer (0.05 M, pH8.3). The beads were re-suspended in sodium boric buffer.

A 22-mer oligonucleotide DNA probe with 5'-amino-C6 modification was dissolved in one hundred microliters of sodium boric buffer to a final concentration of 40 nmol. A 20 microliters of cyanuric chloride in acetonitrile was added to the DNA probe solution and the total volume was brought up to 250 microliter using sodium boric buffer. The solution was agitated at room temperature for one hour and then dialyzed against one liter of boric buffer at room temperature for three hours.

A 100 microliters of the dialyzed DNA solution was mixed with 200 microliters of the dispersion of microspheres. The mixture was agitated at room temperature for one hour and rinsed three times with sodium phosphate buffer (0.01 M, pH7.0).

A 22-mer oligonucleotide DNA with 5'-fluorescein labeling, which has complementary sequence to the 22-mer DNA probe, was dissolved in a hybridization solution containing 0.9 M NaCl, 0.06 M $NaH_2PO_4$, 0.006 M EDTA, and 0.1% SDS, pH 7.6 (6XSSPE-SDS) to a final concentration of 1M. The beads suspension was hybridized in the hybridization solution starting at 68° C. and slowly cooled down to room temperature. Following hybridization, the beads were washed in 0.5XSSPE-SDS for 15 minutes three times. The fluorescence image was acquired using Olympus BH-2 microscope (Diagnostic Instruments, Inc. SPOT camera, CCD resolution of 1315×1033 pixels) with DPlanapo40 UV objective, mercury light source, blue excitation & barrier filters.

Example 5

This example illustrates the influence of different coating methods, control versus invention, on exposure of the upper hemisphere of coated microspheres.

Figure 2:
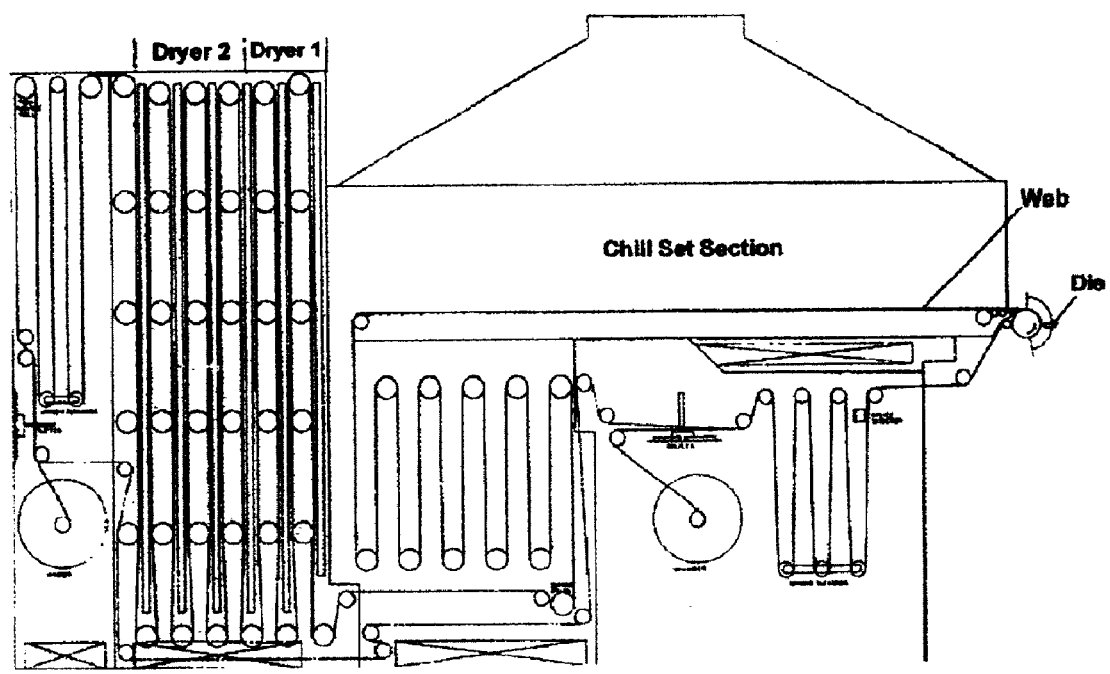
FIG. 2 is a diagram of a coating device for coating on a flexible support.
Figure 3A:
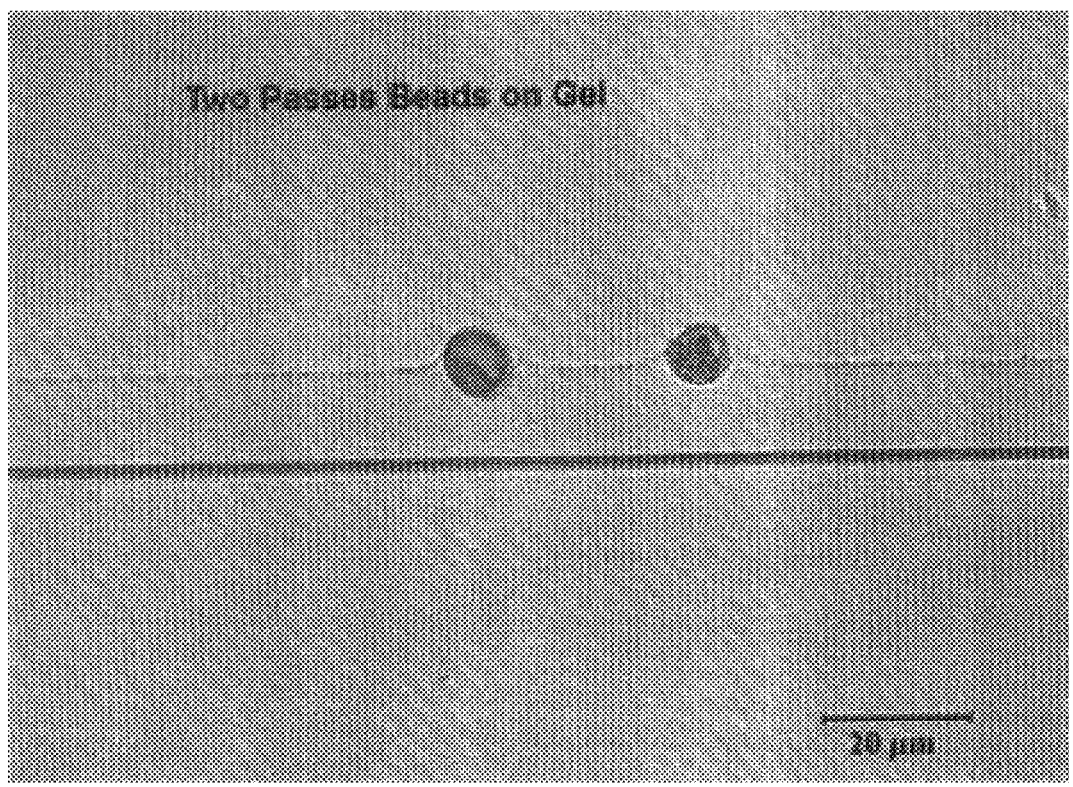
FIG. 3a shows a cross section of the invention wherein the bead surface is exposed.
Figure 3B:
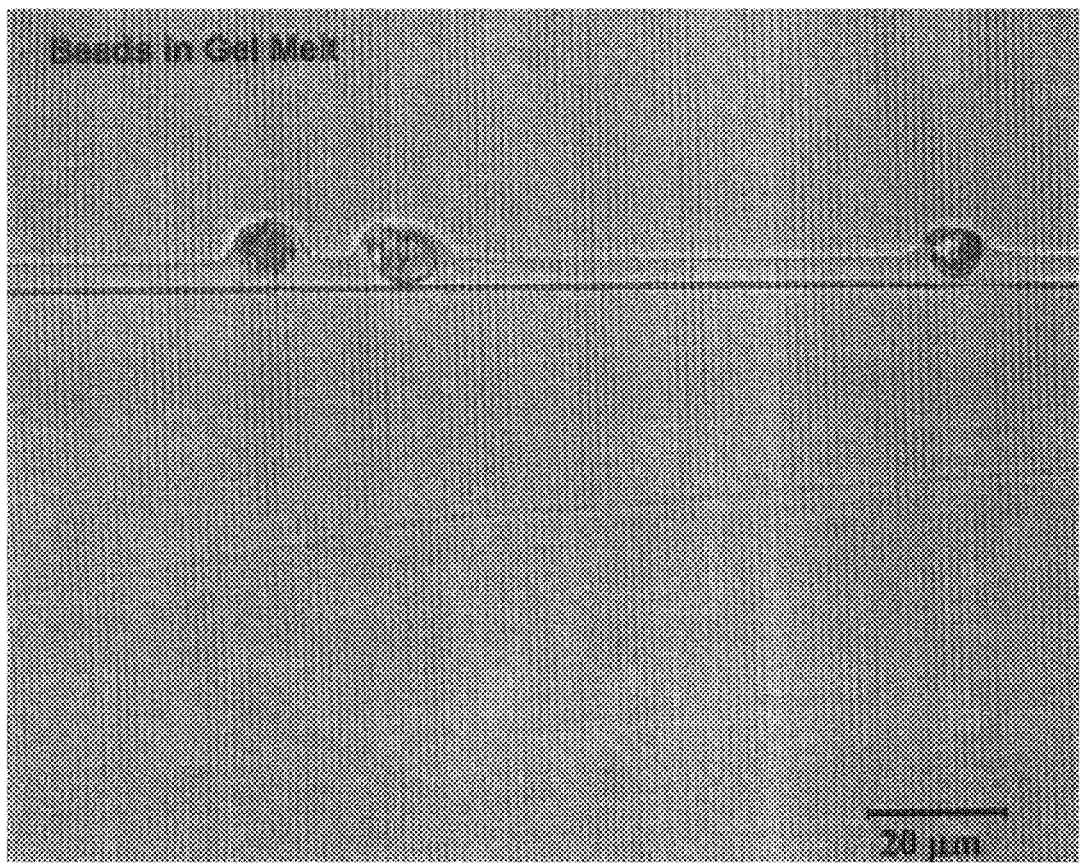
FIG. 3b a cross section of the comparative example wherein the bead surface is covered with the gelling agent.

Coatings generated from both EXAMPLE 1 (control) and EXAMPLE 2–3 (invention) were cross sectioned and the cross sections were imaged under microscope to visualize the extent of gelatin removal. The images were acquired with coatings immersed in 50% glycerol solution and were shown in FIGS. 2A, 2B.

It is noted that there is a noticeable gel overcoat coverage layer on the upper surface of the coated microspheres in the control sample image 2A in contrast to the image of the invention which do not show a gel overcoat coverage layer on the upper surface of the coated microspheres.

The invention has been described in detail with particular reference to preferred embodiments thereof, but it will be understood that variations and modifications can be effected within the spirit and scope of the invention.

What is claimed is:

1. A method of making a microarray comprising the following steps in the order of:
    providing a support;
    coating on the support a receiving layer to receive microspheres, the receiving layer being capable of undergoing sol/gel transition by thermal gelation;
    coating on the receiving layer a dispersion of microspheres in a carrier fluid, wherein the carrier fluid contains at least one crosslinking agent;
    allowing the at least one crosslinking agent to migrate into the receiving layer;
    allowing the microspheres to partially submerge into the receiving layer;
    inducing sol/gel transition by thermal gelation of the receiving layer with the at least one crosslinking agent, thus immobilizing the microspheres;
    evaporating off the carrier fluid; and
    allowing crosslinking between the receiving layer and the crosslinker in the carrier fluid initiated by thermal gelation to go to completion.

2. The method according to claim 1 wherein the receiving layer comprises gelatin.

3. The method according to claim 1 wherein the immobilization of the microspheres on the substrate is preserved upon sol-gel transition of the receiving layer.

4. The method according to claim 1 wherein the dispersion is coated on the receiving layer using knife coating, blade coating or slot coating.

5. The method according to claim 1 wherein the support comprises glass, plastic, cellulose acetate, or polyethyleneterephthalate.

6. The method according to claim 1 wherein the support is flexible.

7. The method according to claim 1 wherein the microspheres bear chemically active sites.

8. The method according to claim 7 wherein the chemically active sites are bioactive.

9. The method according to claim 1 wherein, upon coating the dispersion of microspheres on a receiving layer, said microspheres become immobilized in the plane of coating and form a random pattern on the receiving layer.

10. The method according to claim 1 wherein the receiving layer is characterized by an absence of sites capable of specifically interacting physically or chemically with the microspheres.

11. The method according to claim 1 wherein the support is characterized by an absence of sites capable of specifically interacting physically or chemically with the microspheres.

12. The method according to claim 1 wherein the microspheres can bear surface active sites.

13. The method according to claim 12 wherein the surface active sites can carry organic or inorganic attachments.

14. The method according to claim 12 wherein the surface active site is capable of chemical or physical interaction.

15. The method according to claim 12 wherein the surface active site is bioactive.

16. The method according to claim 15 wherein the bioactive site interacts with nucleic acid, protein, or fragments thereof.

17. The method according to claim 1 wherein the microsphere contains a signature.

18. The method according to claim 1 wherein the microspheres have a mean diameter between 1 and 50 microns.

19. The method according to claim 1 wherein the microspheres have a mean diameter between 3 and 30 microns.

20. The method according to claim 1 wherein the microspheres have a mean diameter between 5 and 20 microns.

21. The method according to claim 1 wherein the microspheres in the dispersion are immobilized on the receiving layer in a concentration between 100 and 1 million microspheres per $cm^2$.

22. The method according to claim 1 wherein the microspheres in the composition are immobilized on the substrate in a concentration between 1000 and 200,000 microspheres per $cm^2$.

23. The method according to claim 1 wherein the microspheres in the composition are immobilized on the substrate in a concentration between 10,000 and 100,000 microspheres per $cm^2$.

24. The method according to claim 1 wherein the microspheres comprise a synthetic or natural polymeric material.

25. The method according to claim 24 wherein the polymeric material is an amorphous polymer.

26. The method according to claim 25 wherein the amorphous polymer is polystyrene.

27. The method according to claim 1 wherein the microspheres contain a surface active site comprising a functionality selected from the group consisting of carboxy, amine, epoxy, hydrazine, aldehyde and combinations thereof.

28. The method according to claim 1 wherein the microspheres contain a polymeric material and less than 30 weight percent of a crosslinking agent.

29. The method according to claim 1 wherein the microspheres are prepared by emulsion polymerization or limited coalescence.

30. The method according to claim 1 wherein the receiving layer is free of receptors designed to physically or chemically interact with the microspheres.

* * * * *